Patented Feb. 10, 1948

2,435,676

UNITED STATES PATENT OFFICE 2,435,676

HERBICIDE

Charles D. Fitzgerald and George E. Lynn, Midland, Mich., assignors to The Dow Chemical Company, Midland, Mich., a corporation of Delaware No Drawing. Application May 31, 1944, Serial No. 538,203

5 Claims. (Cl. 167—45)

This invention relates to herbicides and is particularly concerned with a new and improved herbicidal composition.

Pentachlorophenol and its salts are known to have herbicidal properties. Mixtures of these compounds with other phytotoxic substances such as chlorates and petroleum oil are currently employed as weed killers and for the control of noxious vegetation generally. While the utility of this practice is not questioned, the desirability of providing means to obviate the necessity of using the flammable chlorates and oils in combination with the pentachlorophenolic compounds is evident. This would eliminate problems in the handling of the herbicidal mixtures and of disposing of vegetable residues impregnated therewith. Also, such modified practice would avoid the undesirable deposits of chlorate and oil which normally interfere with subsequent utilization of the soil.

It is an object of the present invention to provide an improved herbicidal composition comprising a pentachlorophenolate as the major phytotoxic ingredient. It is a further object to supply a such composition which will be more effective and faster in its action than the compositions previously employed. Other objects will become apparent from the following specification and claims.

We have discovered that the combination of a water-soluble pentachlorophenolate and a water-soluble salt of a weak base and strong acid constitute a preferred herbicidal mixture, and that in such combination the salt activates the pentachlorophenolate to accomplish a synergistic result. This composition gives a more rapid kill than does the pentachlorophenolate alone, and against many forms of vegetation gives a higher percentage of ultimate kill than can be obtained with the unmodified phenolate. An additional advantage is that the residues of the mixture deposited on the soil do not interfere with its subsequent utilization, the pentachlorophenolate being rapidly oxidized or otherwise decomposed and dissipated by weathering and the action of soil organisms.

In the new compositions, the water-soluble pentachlorophenolate is employed as the principal phytotoxic ingredient. The water-soluble salt of the strong acid and weak base serves as an activator therefor. In addition to these constituents, a suitable wetting agent may also be employed with advantage, although not necessarily. In preparing the compositions, the pentachlorophenolate is dissolved in the required amount of water and the water-soluble salt thereafter added with agitation. The wetting agent may be introduced into the mixture at any point in the compounding operation.

Any suitable amount of the pentachlorophenolate or a mixture of pentachlorophenolates may be employed, the exact proportion being largely dependent upon the volume of composition to be applied over a given area, the prevailing conditions of temperature and humidity, the type of vegetation to be controlled, and the season of application. Thus, when a large volume of spray is to be employed, relatively low concentrations of pentachlorophenolate are required. Smaller amounts and lower concentrations of pentachlorophenolate are effective during hot weather and prior to the time that the plants reach maturity than at the end of the growing season and at low temperatures. Satisfactory results have been obtained when using from 1 to 20 pounds of the pentachlorophenolate per 100 gallons of spray. The amount of water-soluble inorganic salt is generally from about 2 to 20 pounds per 100 gallons.

In applying the new compositions any standard spray rig or hand sprayer may be employed. Best results have been obtained when from 100 to about 250 gallons of spray is applied per acre.

The preferred composition consists of a spray including from 2 to 10 pounds of an alkali metal salt of pentachlorophenolate and particularly sodium pentachlorophenolate per 100 gallons. The preferred activator is ammonium sulfate. A spray mixture found to have properties satisfactory for most herbicidal work includes 6 pounds of sodium pentachlorophenolate and 10 pounds of ammonium sulfate per 100 gallons.

The following examples are illustrative only:

Example 1

6 pounds of pentachlorophenolate was dissolved in 100 gallons of water and 10 pounds of ammonium sulfate added thereto with agitation to obtain an herbicidal spray mixture. This composition was applied with a mechanical spray rig to the aerial portion of mature potatoes at the rate of 150 gallons per acre. The application was made late in the growing season and at a time when the plants were mature and a high proportion of the tubers were of a size to classify as No. 1 grade. In 24, 48, 72, and 96 hours after application the kill of potato tops amounted to 50, 80, 95, and 100 per cent, respectively.

In a comparative determination with a spray containing 6 pounds of sodium pentachlorophenolate per 100 gallons, the kills in 24, 48, 72, and 96 hours were 0, 20, 70, and 80 per cent, respectively. The application of a spray containing 10 pounds of ammonium sulfate per 100 gallons failed to kill any of the vines in 96 hours.

Example 2

Further quantities of spray mixture were prepared as described in Example 1 by successively dissolving sodium pentachlorophenolate and ammonium sulfate in water in the proportions indicated. The 48-hour kills obtained when this composition was applied for the control of poison ivy, wild carrot, milkweed, and willow were 100, 75, 100, and 50 per cent, respectively.

In analogous operations with a spray containing 6 pounds of pentachlorophenolate alone per 100 gallons, the kills against poison ivy, wild carrot, milkweed and willow were 50, 0, 25, and 0 per cent, respectively.

Example 3

A spray was prepared by dissolving 8 pounds of sodium pentachlorophenolate in 100 gallons of water and thereafter adding with agitation 4 pounds of ammonium sulfate per 100 gallons. Sufficient of a commercial wetting agent marketed as "Vatsol" (consisting essentially of dioctyl sodium sulfosuccinate) was added to give a concentration of 0.1 per cent in the mixture. This composition was applied with a conventional hand sprayer for the control of mustard, wild radish, malva, nettle, morning-glory, clover and alfilaria. The rate of application was 150–175 gallons per acre. The kills obtained against the several different plants in 48 hours were 50, 50, 50, 50, 75, 25, and 100 per cent, respectively. In a comparative determination with sodium pentachlorophenolate at 8 pounds per 100 gallons of 0.1 per cent aqueous "Vatsol" solution, the kills obtained against mustard, radish, malva, nettle, morning-glory, clover, and alfilaria were 25, 25, 5, 5, 50, 5, and 5 per cent, respectively. With ammonium sulfate at 4 pounds per 100 gallons of 0.1 per cent aqueous "Vatsol" solution, kills of the several plant species were 10, 10, 5, 5, 10, 5, and 5 per cent, respectively.

While the foregoing examples have been particularly concerned with compositions containing sodium pentachlorophenolate, it is to be understood that other soluble phenolates may be substituted therefor to obtain comparable results. Representative of such compounds are potassium pentachlorophenolate, strontium pentachlorophenolate, triethanolamine pentachlorophenolate, monoethanolamine pentachlorophenolate, and the like. Other water-soluble salts of weak bases and strong acids adapted to be employed in accordance with the present invention are ammonium acid sulfate, ammonium chloride, ammonium bromide, ammonium nitrate, and other acid reacting ammonium salts as well as aluminum sulfate, aluminum nitrate, and the like. Wetting agents which can be included in compositions containing one or a mixture of the water-soluble phenolates and activating amounts of acid reacting salts include sodium lauryl sulfate, sulfuric acid derivatives of fatty acids, alcohols, phenols and hydrocarbons, and their salts, complex ether-alcohols, etc. Supplementary phytotoxicants suitable for inclusion in the described mixtures include calcium chlorate, ammonium sulfamate, etc.

We claim:

1. An herbicidal composition comprising a water-soluble pentachlorophenolate as the principal phytotoxic ingredient and, as an activator therefor, a water-soluble salt of a strong acid and a weak base.

2. An herbicidal composition comprising an alkali metal pentachlorophenolate as the principal phytotoxic ingredient and, as an activator therefor, an acid reacting ammonium salt.

3. An herbicidal composition comprising an alkali metal pentachlorophenolate as the principal phytotoxic ingredient and, as an activator therefor, ammonium sulfate.

4. An aqueous herbicidal spray having dispersed therein from 2 to 10 pounds of sodium pentachlorophenolate and from 2 to 20 pounds of an acid reacting ammonium salt per 100 gallons.

5. An aqueous herbicidal spray having dispersed therein from 2 to 10 pounds of sodium pentachlorophenolate and from 2 to 20 pounds of ammonium sulfate per 100 gallons.

CHARLES D. FITZGERALD.
GEORGE E. LYNN.

REFERENCES CITED

The following references are of record in the file of this patent:

UNITED STATES PATENTS

| Number | Name | Date |
|---|---|---|
| 1,625,608 | Holmes | Apr. 19, 1927 |
| 1,925,628 | Chipman | Sept. 5, 1933 |
| 2,188,734 | Carswell | Jan. 30, 1940 |
| 2,370,349 | Hance | Feb. 27, 1945 |